United States Patent
Hara et al.

(10) Patent No.: US 11,458,940 B2
(45) Date of Patent: Oct. 4, 2022

(54) BRAKING CONTROL APPARATUS FOR VEHICLE

(71) Applicants: Toyota Jidosha Kabushiki Kaisha, Toyota (JP); Advics Co., Ltd., Kariya (JP)

(72) Inventors: Masahiro Hara, Gotemba (JP); Hiroaki Nagase, Fujisawa (JP); Kei Amamoto, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 453 days.

(21) Appl. No.: 16/577,426

(22) Filed: Sep. 20, 2019

(65) Prior Publication Data
US 2020/0094798 A1   Mar. 26, 2020

(30) Foreign Application Priority Data

Sep. 21, 2018 (JP) .............................. JP2018-177865

(51) Int. Cl.
*B60T 8/1761* (2006.01)
*B60T 8/1755* (2006.01)

(52) U.S. Cl.
CPC ........ *B60T 8/17616* (2013.01); *B60T 8/1755* (2013.01); *B60T 2240/00* (2013.01); *B60T 2270/10* (2013.01); *B60T 2270/30* (2013.01)

(58) Field of Classification Search
CPC ..................................................... B60T 8/1755
See application file for complete search history.

(56) References Cited

U.S. PATENT DOCUMENTS

| | | | | |
|---|---|---|---|---|
| 2007/0193802 A1* | 8/2007 | Hu | ......................... | B60K 28/16 180/197 |
| 2008/0300765 A1* | 12/2008 | Kato | ..................... | B60T 8/4872 701/90 |
| 2011/0218700 A1* | 9/2011 | Mori | ..................... | B60W 10/06 701/31.4 |
| 2015/0105978 A1 | 4/2015 | Nakatsu | | |

FOREIGN PATENT DOCUMENTS

| | | |
|---|---|---|
| CN | 104554265 A | 4/2015 |
| JP | 2018-062295 A | 4/2018 |

* cited by examiner

*Primary Examiner* — Imran K Mustafa
(74) *Attorney, Agent, or Firm* — Dinsmore & Shohl LLP

(57) ABSTRACT

A brake ECU sets target slippage degrees of three wheels other than the front outer wheel to the slippage degree of the front outer wheel and feedback-controls the braking forces of the three wheels such that the actual slippage degrees of the three wheels approach the target slippage degrees. The brake ECU computes a correction amount for the slip ratio deviation of the front inner wheel such that the slip ratio deviation becomes zero. The brake ECU multiplies the correction amount for the slip ratio deviation by a load ratio and uses the resultant value as a correction amount for the slip ratio deviation of the rear inner wheel. The brake ECU corrects the slip ratio deviation by using the computed correction amount.

14 Claims, 5 Drawing Sheets

BRAKING CONTROL APPARATUS FOR VEHICLE

CROSS-REFERENCE TO RELATED APPLICATIONS

This application claims priority to Japanese Patent Application No. JP2018-177865 filed on Sep. 21, 2018, the content of which is hereby incorporated by reference in its entirety into this application.

BACKGROUND

1. Technical Field

The present disclosure relates to a braking control apparatus for a vehicle (hereinafter may be referred to as a "vehicular braking control apparatus") which performs braking force distribution control.

2. Description of the Related Art

As has been known, in a vehicle such as an automobile, braking force distribution control for controlling distribution of braking forces to front and rear wheels has conventionally been used in order to secure the stability of the vehicle during braking. Specifically, when conditions set in advance are satisfied, the braking force distribution control limits an increase in rear wheel braking force, thereby securing the vehicle stability. For example, in a braking control apparatus proposed in Japanese Patent Application Laid-Open (kokai) No. 2018-62295 (hereinafter referred to as "Conventional Apparatus 1"), when the deceleration of a vehicle is equal to or greater than a predetermined value, the apparatus controls the braking forces of the left and right rear wheels independently of each other such that the slippage degrees of the left and right rear wheels approach a target slippage degree which is common therebetween. For example, the target slippage degree is set to the average of the slippage degrees of the left and right front wheels.

In the case where the center of gravity of the vehicle deviates in a lateral direction from the center of the vehicle, the positional deviation of the center of gravity causes generation of yaw moment (spin yaw moment), due to which the vehicle yaws toward the wheels on which smaller vertical loads are imposed. In the case where the left and right wheels differ in vertical load, the left and right wheels differ in degree of slippage.

Namely, the smaller the vertical load, the larger the slippage degree. In Conventional Apparatus 1, since the braking forces of the left and right rear wheels are controlled such that the slippage degrees of the left and right rear wheels approach the common target slippage degree, the braking force of the rear outer wheel, which is a rear wheel whose slippage degree is smaller, becomes larger than the braking force of the rear inner wheel, which is a rear wheel whose slippage degree is larger. In other words, the braking force of the rear inner wheel, which is a rear wheel whose slippage degree is larger, becomes smaller than the braking force of the rear outer wheel, which is a rear wheel whose slippage degree is smaller. In this manner, an anti-spin yaw moment is generated from the difference between the braking forces of the left and right rear wheels, whereby the yawing of the vehicle can be suppressed.

The idea of braking force distribution control in Conventional Apparatus 1 may be applied to the case where a vehicle is in a turning state. When the vehicle is turning, the difference in left-hand-side and right-hand-side loads of the vehicle body (difference in the vertical loads imposed on the left and right wheels, respectively) becomes remarkable as compared with the cases where the vehicle travels straight. Therefore, a conceivable way of improving the stability of braking is to control the braking forces of the front wheels in such a manner as to eliminate the difference in slippage degree between the left and right front wheels as well as the difference in slippage degree between the left and right rear wheels. However, since a larger braking force is distributed to the front wheels as compared with the rear wheels, the actual change in the front wheel braking force caused by a change in control pressure is greater than the actual change in the rear wheel braking force. Namely, as compared with the rear wheels, the front wheels are rougher in the degree of correction of vehicle behavior by braking force control (i.e., vehicle behavior can be corrected only roughly by braking force control for the front wheels as compared with the case where vehicle behavior is corrected by braking force control for the rear wheels). Accordingly, the distribution of braking forces must be controlled such that a behavioral error (oversteer or understeer) does not arise.

SUMMARY OF THE INVENTION

The present disclosure has been accomplished so as to solve the above-described problem, and one object of the present disclosure is to provide a braking control apparatus for a vehicle which performs braking force distribution control for a vehicle such that, when the vehicle turns, the vehicle exhibits a stable turning behavior.

In order to achieve the above-described object, the present disclosure provides an improved braking control apparatus for a vehicle comprising:

a brake apparatus (20) which can control braking forces of left and right front wheels and left and right rear wheels independently of one another;

slippage degree detection means (50, 70, 71) for detecting slippage degrees of the left and right front wheels and the left and right rear wheels; and rear wheel braking force control means (51 to 54) for controlling the braking forces of the left and right rear wheels independently of each other through feedback control based on rear wheel slippage deviations which are deviations of the slippage degrees of the left and right rear wheels from a target slippage degree common between the left and right rear wheels such that the slippage degrees of the left and right rear wheels approach the target slippage degree.

The braking control apparatus of the present disclosure is characterized by further comprising:

front wheel slippage deviation computation means (S16) for computing a front wheel slippage deviation which is a slippage degree deviation between the left and right front wheels;

turning determination means (S11, S13) for determining whether or not the vehicle is in a turning state;

correction means (S16 to S22), operable when the turning determination means determines that the vehicle is in the turning state, for correcting a feedback controlled variable (K1·ΔS) based on the rear wheel slippage deviation in the rear wheel braking force control means by an amount corresponding to the front wheel slippage deviation, thereby generating an anti-spin yaw moment in a direction opposite a direction of a spin yaw moment of the vehicle generated as a result of load movement in a lateral direction.

The braking control apparatus for a vehicle according to the present disclosure comprises a brake apparatus, slippage degree detection means, and rear wheel braking force control means. The brake apparatus is an apparatus which can control the braking forces of the left and right front wheels and the left and right rear wheels independently of one another. The slippage degree detection means detects slippage degrees (for example, slip ratios) of the left and right front wheels and the left and right rear wheels. The rear wheel braking force control means controls the braking forces of the left and right rear wheels independently of each other through feedback control based on rear wheel slippage deviations which are deviations of the slippage degrees of the left and right rear wheels from a target slippage degree common between the left and right rear wheels, such that the slippage degrees of the left and right rear wheels approach the target slippage degree.

In the case where the position of the center of gravity of the vehicle has deviated in the lateral direction from the vehicle center, when braking forces of the same magnitude are applied to left and right wheels, a spin yaw moment is generated such that the vehicle yaws toward the side where the vertical load is smaller. Further, the slip ratio of a wheel during braking is in inverse proportion to the vertical load of the wheel. Accordingly, when the braking force control by the rear wheel braking force control means is performed, the braking force of the rear wheel on the side where the vertical load is large (the side where the slippage degree is small) increases, and the braking force of the rear wheel on the side where the vertical load is small (the side where the slippage degree is large) decreases. As a result, an anti-spin yaw moment which decreases the spin yaw moment can be generated by the difference in braking force between the left and right rear wheels.

In the case where the vehicle is turning as a result of a driver's steering wheel operation or automatic driving, the difference between the loads acting on the left and right sides, respectively, of the vehicle body (the difference in vertical load between the left and right wheels) becomes remarkable as compared with the case where the vehicle travels straight. Therefore, the anti-spin yaw moment may be insufficient for the spin yaw moment.

A conceivable method of enhancing braking stability is controlling the baking forces of the front wheels to eliminate not only the difference in slippage degree between the left and right rear wheels but also the difference in slippage degree between the left and right front wheels. However, since a larger braking force is distributed to the front wheels as compared with the rear wheels, the actual changes in the braking forces of the front wheels stemming from a change in control pressure is remarkably large as compared with the rear wheels. In view of this, in the present disclosure, the controlled variables of the braking forces of the rear wheels are corrected on the basis of the difference between the slippage degrees of the left and right front wheels.

In order to perform such correction, the braking control apparatus of the present disclosure comprises front wheel slippage deviation computation means, turning determination means, and correction means. The front wheel slippage deviation computation means computes a front wheel slippage deviation which is a slippage degree deviation between the left and right front wheels. The turning determination means determines whether or not the vehicle is in a turning state. For example, the turning determination means may be means for determining a travel state in which the center of gravity of the vehicle moves in the lateral direction, and determines that the vehicle is in a turning state in the case where the lateral acceleration of the vehicle is equal to or greater than a threshold value for determination.

The correction means operates when the turning determination means determines that the vehicle is in the turning state. The correction means corrects a feedback controlled variable based on the rear wheel slippage deviation in the rear wheel braking force control means by an amount corresponding to the front wheel slippage deviation, thereby generating an anti-spin yaw moment in a direction opposite a direction of a spin yaw moment of the vehicle generated as a result of load movement in the lateral direction. In this case, the correction means may correct the feedback controlled variable of either one of the left and right rear wheels or may correct the feedback controlled variables of the left and right rear wheels. For example, the correction means may correct the feedback controlled variable of the rear inner wheel, which is one of the left and right rear wheels located on the inner side of a turning locus, to decrease the feedback controlled variable. Alternatively, the correction means may correct the feedback controlled variable of the rear outer wheel, which is one of the left and right rear wheels located on the outer side of the turning locus, to increase the feedback controlled variable. Alternatively, the correction means may correct the feedback controlled variables of the rear inner wheel and the rear outer wheel as described above.

As described above, the feedback controlled variable in the rear wheel braking force control means is corrected by an amount corresponding to the front wheel slippage deviation. Thus, the anti-spin yaw moment can be increased without adjustment of the braking forces of the front wheels. Accordingly, since the braking forces can be controlled by using the rear wheels which are finer in the degree of correction of vehicle behavior by braking force control than the front wheels, stable vehicle turning behaviors are obtained. As a result, a behavioral error (for example, oversteer or understeer) can be suppressed.

According to another aspect of the present disclosure, the correction means is configured to correct the feedback controlled variable in the rear wheel braking force control means by correcting the rear wheel slippage deviation ($\Delta$SRin) such that the rear wheel slippage deviation ($\Delta$SRin) increases with increasing the front wheel slippage deviation ($\Delta$SFin) (S20).

In this case, the feedback controlled variable in the rear wheel braking force control means can be corrected well. Notably, the correction of the slip deviation is correction (adjustment) for creating an apparent control state in which slippage has occurred (or no slippage has occurred).

According to still another aspect of the present disclosure, the braking control apparatus further comprises front wheel braking force control means (51 to 54) for controlling the braking force of one wheel of the left and right front wheels through feedback control based on the front wheel slippage deviation such that the slippage degree of the one wheel approaches the slippage degree of the other wheel, wherein the correction means is configured to correct a feedback controlled variable of the one wheel based on the front wheel slippage deviation such that the feedback controlled variable becomes zero; and to correct the feedback controlled variable in the rear wheel braking force control means by an amount corresponding to the correction amount of the feedback controlled variable of the one wheel (S20).

In this case, the front wheel braking force control means controls the braking force of one wheel of the left and right front wheels through feedback control based on the front wheel slippage deviation such that the slippage degree of the one wheel approaches the slippage degree of the other wheel. Accordingly, an anti-spin yaw moment can be generated by the front wheel braking force control means.

The correction means corrects the feedback controlled variable of the one wheel based on the front wheel slippage deviation such that the feedback controlled variable become zero. Accordingly, an anti-spin yaw moment which is originally to be generated by the front wheel braking force control means is not generated.
The correction means corrects the feedback controlled variable in the rear wheel braking force control means by an amount corresponding to the correction amount of the feedback controlled variable of the one wheel. Accordingly, the feedback controlled variable in the rear wheel braking force control means can be corrected such that the anti-spin yaw moment which would be generated if the feedback controlled variable of the one wheel were not corrected is generated by the feedback control of the rear wheel braking force control means. As a result, without use of the control of the braking forces of the front wheels, a proper anti-spin yaw moment can be generated by the control of the braking forces of the rear wheels.

According to still another aspect of the present disclosure, the correction means is configured to correct the feedback controlled variable of the one wheel based on the front wheel slippage deviation by correcting the front wheel slippage deviation such that the front wheel slippage deviation becomes zero (S20).

In this case, the correction means corrects the front wheel slippage deviation such that the front wheel slippage deviation becomes zero. As a result, the feedback controlled variable of the one wheel based on the front wheel slippage deviation can be made zero.

According to still another aspect of the present disclosure, the correction means is configured to determine the correction amount of the feedback controlled variable of one wheel of the left and right front wheels such that an anti-spin yaw moment is generated by the feedback control of the one wheel of the left and right front wheels (S22, S23) only when the braking force control performed by the rear wheel braking force control means has reached a limit (S19: No).

In the case where the braking force control in the rear wheel braking force control means has reached the limit, it becomes impossible to generate an anti-spin yaw moment further at the rear wheels. In view of this, the correction means determines the correction amount of the feedback controlled variable of one wheel of the left and right front wheels such that an anti-spin yaw moment is generated by the feedback control of the one wheel of the left and right front wheels only when the braking force control in the rear wheel braking force control means has reached the limit. Accordingly, it is possible to generate an anti-spin yaw moment by using the rear wheels preferentially when the rear wheels have not yet reached their control limit, and generate an anti-spin yaw moment by the braking force control for the front wheel (the one wheel) only when the rear wheels have reached their braking force limits.

According to still another aspect of the present disclosure, the front wheel braking force control means is configured to select, as a reference wheel, a front outer wheel, which is one of the left and right front wheels located on the outer side of a turning locus; and to control the braking force of a front inner wheel, which is the other of the left and right front wheels located on the inner side of the turning locus, by the feedback control based on the front wheel slippage deviation, such that the slippage degree of the front inner wheel approaches the slippage degree of the reference wheel (51 to 54); and the correction means is configured to correct the feedback controlled variable of the front inner wheel based on the front wheel slippage deviation such that the feedback controlled variable becomes zero, and to correct the feedback controlled variable of a rear inner wheel, which is one of the left and right rear wheels located on the inner side of the turning locus, by an amount corresponding to the correction amount of the feedback controlled variable of the front inner wheel (20).

In this case, the front wheel braking force control means selects, as a reference wheel, the front outer wheel which is one of the left and right front wheels located on the outer side of a turning locus, and controls the braking force of the front inner wheel by the feedback control based on the front wheel slippage deviation such that the slippage degree of the front inner wheel which is the other of the left and right front wheels located on the inner side of the turning locus approaches the slippage degree of the reference wheel. Accordingly, an anti-spin yaw moment can be generated by the front wheel braking force control means.

The correction means corrects the feedback controlled variable of the front inner wheel based on the front wheel slippage deviation such that the feedback controlled variable becomes zero. Accordingly, the anti-spin yaw moment which is originally to be generated by the front wheel braking force control means is not generated. The correction means corrects the feedback controlled variable of the rear inner wheel by an amount corresponding to the correction amount of the feedback controlled variable of the front inner wheel. Accordingly, a proper anti-spin moment can be generated by the braking force control for the rear inner wheel without use of the braking force control for the front wheels.

According to still another aspect of the present disclosure, the braking control apparatus further comprises:

target slippage degree setting means (S12, S14) for setting target slippage degrees of three wheels other than the front outer wheel to the slippage degree of the front outer wheel, wherein the front wheel braking force control means is configured to control the braking force of the front inner wheel by the feedback control based on the front wheel slippage deviation such that the slippage degree of the front inner wheel approaches the target slippage degree (51 to 54);

the rear wheel braking force control means is configured to control the braking forces of the rear inner wheel and the rear outer wheel by the feedback control based on each rear wheel slippage deviation such that the slippage degrees of the rear inner wheel and the rear outer wheel approach the target slippage degrees (51 to 54); and the correction means is configured to correct the feedback controlled variable of the front inner wheel based on the front wheel slippage deviation by correcting the front wheel slippage deviation such that the front wheel slippage deviation becomes zero; to compute a rear-converted front deviation ($\Delta$SFin'), which is a value of the rear wheel slippage deviation obtained by multiplying the front wheel slippage deviation by a predetermined conversion coefficient (Wf/Wr); and to correct the feedback controlled variable of the rear inner wheel by adding the rear-converted front deviation to the deviation of the slippage degree of the rear inner wheel from the target slippage degree (S16, S20).

In this case, the target slippage degree setting means sets target slippage degrees of three wheels other than the front outer wheel to the slippage degree of the front outer wheel (the slippage degree detected by the slippage degree detection means). The front wheel braking force control means controls the braking force of the front inner wheel by the feedback control based on the front wheel slippage deviation such that the slippage degree of the front inner wheel approaches the target slippage degree. The rear wheel braking force control means controls the braking forces of the rear inner wheel and the rear outer wheel by the feedback control based on each rear wheel slippage deviation such that the slippage degrees of the rear inner wheel and the rear outer wheel (one of the left and right rear wheels located on the outer side of the turning locus) approach the target slippage degrees.

The correction means corrects the front wheel slippage deviation such that the front wheel slippage deviation becomes zero. Consequently, the feedback controlled variable of the front inner wheel based on the front wheel slippage deviation can be made zero. Further, the correction means computes a rear-converted front deviation, which is a value of the rear wheel slippage deviation obtained by multiplying the front wheel slippage deviation by a predetermined conversion coefficient. This conversion coefficient may be, for example, the ratio of the vertical loads of the front wheels and the rear wheels. For example, the distribution of the braking forces to the front wheels and the rear wheels is performed in accordance with the vertical load ratio between the front wheels and the rear wheels. Therefore, the front wheel slippage deviation can be converted to the rear wheel slippage deviation by multiplying the front wheel slippage deviation by a conversion coefficient corresponding to the vertical load ratio. The correction means corrects the feedback controlled variable of the rear inner wheel by adding the rear-converted front deviation to the deviation of the slippage degree of the rear inner wheel from the target slippage degree.

Accordingly, the controlled variable of the front inner wheel can be properly transferred to the rear inner wheel. As a result, the anti-spin yaw moment which is originally to be generated by the braking force control for the front inner wheel can be properly generated by the braking force control for the rear inner wheel.

According to still another aspect of the present disclosure, the correction means is configured to determine the correction amount of the feedback controlled variable of the front inner wheel such that the braking force of the front inner wheel decreases (S22, S23) in the case where the rear inner wheel has reached a control limit state in which the braking force of the rear inner wheel cannot be decreased.

When the braking force of the rear inner wheel is corrected by adding the rear-converted front deviation to the deviation of the slippage degree of the rear inner wheel, the braking force of the rear inner wheel is decreased. In this case, the rear inner wheel may reach the control limit (a state in which the braking force of the rear inner wheel cannot be decreased). In view of this, according to another aspect of the present disclosure, in the case where the rear inner wheel has reached the control limit and the braking force of the rear inner wheel cannot be decreased, the correction means determines the correction amount for the feedback controlled variable of the front inner wheel such that the braking force of the front inner wheel decreases. Accordingly, it is possible to generate an anti-spin yaw moment by using the rear inner wheel preferentially when the rear inner wheel has not yet reached its control limit, and generate an anti-spin yaw moment by the braking force control for the front inner wheel only when the rear inner wheel has reached its braking force limit.

According still another aspect of the present disclosure, the braking control apparatus further comprises: end determination means (S31) for determining whether or not the control of the braking force of the rear inner wheel by the rear wheel braking force control means has ended; and continuation prohibition control means (S35) for prohibiting the front wheel braking force control means from continuing the control of the braking force of the front inner wheel when the end determination means determines that the control of the braking force of the rear inner wheel has ended.

The correction of the feedback controlled variable of the rear inner wheel is performed by an amount corresponding to the correction of the feedback controlled variable of the front inner wheel. Therefore, if the braking force control (feedback control) of the front inner wheel is continued after the braking force control (feedback control) of the rear inner wheel has ended, there arises a possibility that the braking force control of the vehicle as a whole cannot be performed properly.

In view of the above, according to another aspect of the present disclosure, the end determination means determines whether or not the control of the braking force of the rear inner wheel by the rear wheel braking force control means has ended. The continuation prohibition control means prohibits the front wheel braking force control means from continuing the control of the braking force of the front inner wheel when the end determination means determines that the control of the braking force of the rear inner wheel has ended. As a result, the braking force control of the vehicle as a whole can be performed properly.

In the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols.

DETAILED DESCRIPTION

A vehicular braking control apparatus according to an embodiment of the present disclosure will now be described with reference to the drawings.

Figure 1:
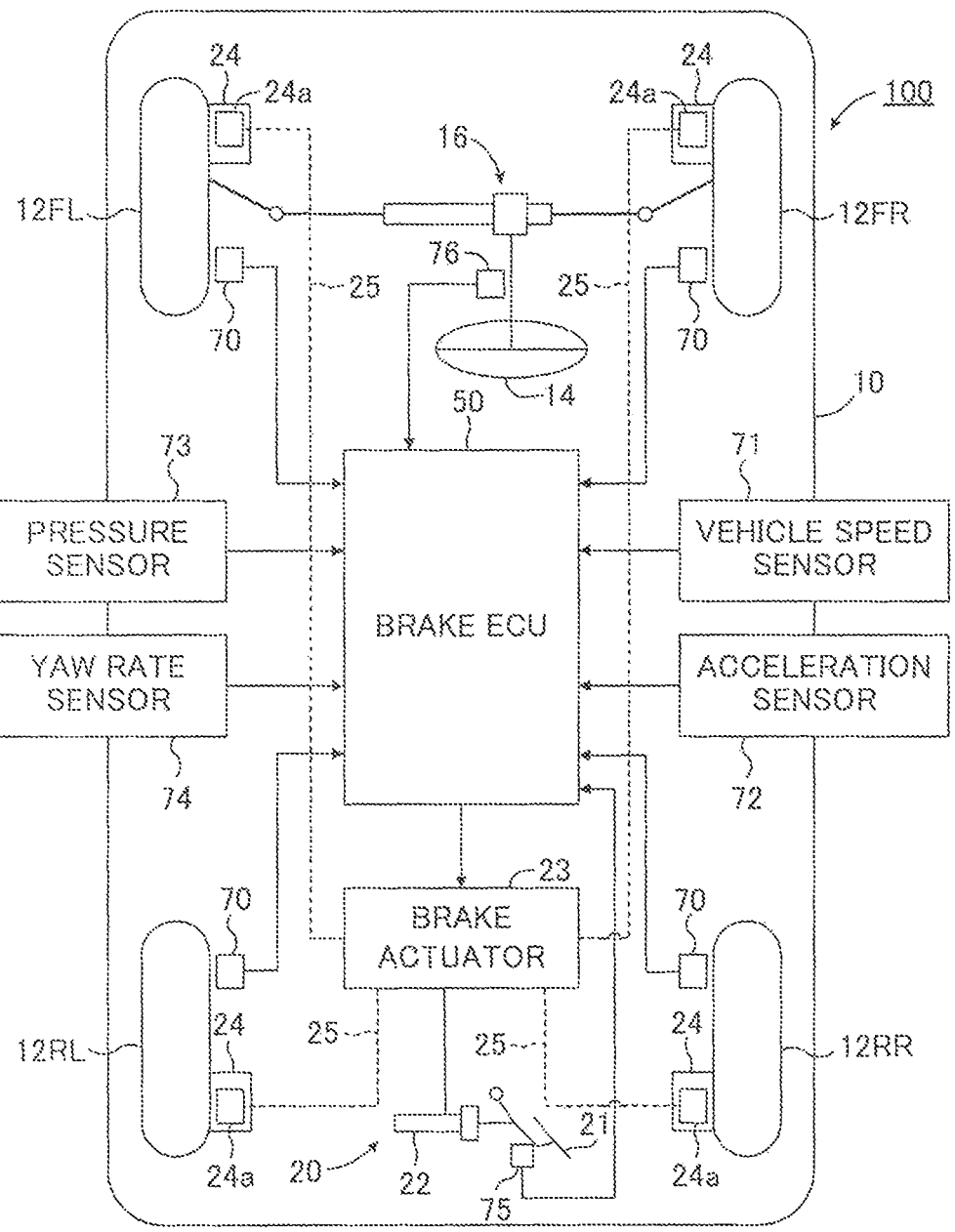
FIG. 1 is a schematic diagram of a vehicular braking control apparatus according to an embodiment of the present disclosure.

FIG. 1 schematically shows the configuration of a vehicular braking control apparatus 100 according to the embodiment of the present disclosure. A vehicle 10 in which the vehicular braking control apparatus 100 is provided includes a left front wheel 12FL, a right front wheel 12FR, a left rear wheel 12RL, and a right rear wheel 12RR. The left and right front wheels 12FL and 12FR, which are steerable wheels, are steered by a rack-and-pinion-type power steering apparatus 16 which is driven in response to operation of a steering wheel 14 by a driver.

The vehicle 10 includes a brake apparatus 20 and a brake ECU 50 for controlling operation of the brake apparatus. The brake ECU 50 is connected to other ECUs (for example, an engine ECU, etc.) through an unillustrated CAN (controller area network) in such a manner that the brake ECU 50 can send information to the other ECUs and can receive information from the other ECUs. Notably, ECU stands for an electric control unit which includes a microcomputer as a main component. In the present specification, the microcomputer includes a CPU, a ROM, a RAM, a non-volatile memory, an interface I/F, etc. The CPU realizes various functions by executing instructions (programs, routines) stored in the ROM.

The brake apparatus 20 includes a brake pedal 21, a master cylinder 22, a brake actuator 23, brake mechanisms 24, and hydraulic piping 25. The master cylinder 22 generates an oil pressure in proportion to a depressing force applied to the brake pedal 21 and supplies the generated oil pressure to the brake actuator 23. The brake actuator 23 includes a hydraulic circuit present between the master cylinder 22 and the brake mechanisms 24. An electric pump for increasing the brake oil pressure independently of the master cylinder pressure, a reservoir for storing brake oil, and a plurality of electromagnetic valves are provided in the hydraulic circuit.

The brake mechanisms 24 are connected to the brake actuator 23 through the hydraulic piping 25. The brake mechanisms 24 are respectively provided in the wheels 12FL, 12FR, 12RL, and 12RR. Each brake mechanism 24 includes a brake disc rotating together with the corresponding wheel 12 and a brake caliper fixed to the vehicle body side. By the oil pressure in a wheel cylinder 24a provided in the brake caliper, brake pads are pressed against the brake disc, so that a frictional braking force is generated. Accordingly, each brake mechanism 24 generates braking force corresponding to the brake oil pressure supplied from the brake actuator 23.

The brake actuator 23 can individually adjust the brake oil pressures supplied to the wheels 12FL, 12FR, 12RL, and 12RR by controlling the electromagnetic valves provided in the hydraulic circuit. The braking forces applied to the respective wheels are determined by the brake oil pressures supplied to the respective wheel cylinders 24a.

The brake ECU 50 is electrically connected to the brake actuator 23 and outputs control signals to the pump and the electromagnetic valves provided in the brake actuator 23. Therefore, the brake ECU 50 can control the braking forces of the wheels 12FL, 12FR, 12RL, and 12RR independently of one another by controlling the operation of the brake actuator 23. In a state in which the operation of the brake actuator 23 is not controlled, the oil pressure of the master cylinder 22 is supplied to the wheel cylinders 24a of the four wheels. Braking forces distributed to the front wheels 12FL and 12FR are larger than those distributed to the rear wheels 12RL and 12RR.

Wheel speed sensors 70, a vehicle speed sensor 71, an acceleration sensor 72, a pressure sensor 73, a yaw rate sensor 74, a brake stepping force sensor 75, and a steering angle sensor 76 are connected to the brake ECU 50. The brake ECU 50 receives detection signals output from these sensors. The wheel speed sensors 70 are individually provided for the wheels 12FL, 12FR, 12RL, and 12RR and output detection signals representing wheel speeds corresponding to the rotational speeds of the wheels 12FL, 12FR, 12RL, and 12RR. The vehicle speed sensor 71 outputs a detection signal representing the speed of the vehicle body (vehicle speed). The acceleration sensor 72 outputs a detection signal representing acceleration in the front-back direction of the vehicle (longitudinal acceleration) and a detection signal representing acceleration in the lateral direction of the vehicle (lateral acceleration). The pressure sensor 73 outputs a detection signal representing the pressure of the master cylinder 22 and detection signals representing the pressures of the wheel cylinders 24a, respectively. The yaw rate sensor 74 outputs a detection signal representing the yaw rate of the vehicle. The brake stepping force sensor 75 outputs a detection signal representing the stepping force input to the brake pedal by the driver. The steering angle sensor 76 outputs a detection signal representing the steering angle of the steering wheel.

The steering angle sensor 76 is configured to output zero as the steering angle St when the vehicle travels straight forward, to output a positive value as the steering angle St when the vehicle turns leftward, and to output a negative value as the steering angle St when the vehicle turns rightward. Like the steering angle sensor 76, the yaw rate sensor 74 is configured to output zero as an actual yaw rate YR when the vehicle travels straight forward (when the vehicle does not yaw), to output a positive value as the actual yaw rate YR when the vehicle yaws leftward, and to output a negative value as the actual yaw rate YR when the vehicle yaws rightward. Like the steering angle sensor 76, the acceleration sensor 72 is configured to output zero as a lateral acceleration Gy when the vehicle travels straight forward (no lateral acceleration acts on the vehicle), to output a positive value as the lateral acceleration Gy when a leftward lateral acceleration acts on the vehicle, and to output a negative value as the lateral acceleration Gy when a rightward lateral acceleration acts on the vehicle.

Next, EBD control performed by the brake ECU 50 will be described.

In general, control for distributing braking forces to the front wheels and the rear wheels is performed in order to secure the stability of the vehicle during braking. Such braking force distribution control is called electronic brake force distribution (EBD) control. In the EBD control in the above-described Conventional Apparatus 1, the target slip ratios of the left and right rear wheels are set to a common target slip ratio (the average of the slip ratios of the left and right front wheels). As a result, in the case where the position of the center of gravity of the vehicle has deviated in the lateral direction from the vehicle center, it is possible to produce a difference in braking force between the left and right rear wheels, thereby generating an anti-spin yaw moment which reduces the turning yaw moment (spin yaw moment) produced as a result of the deviation of the position of the center of gravity. In a situation where the driver causes the vehicle to travel straight, stable behavior of the vehicle can be secured by such a method.

Meanwhile, in the case where the vehicle is turning as a result of a driver's steering wheel operation or automatic steering, the difference between the loads acting on the left and right sides, respectively, of the vehicle body (the difference in vertical load between the left and right wheels) becomes remarkable as compared with the case where the vehicle travels straight. Therefore, in the above-described method, the anti-spin yaw moment is insufficient for the spin yaw moment.

In view of the above, in the EBD control of the present embodiment, the EBD control is switched between a mode for a situation where the lateral deviation of the position of the center of gravity of the vehicle from the vehicle center is large (the vehicle is turning) and a mode for a situation where the lateral deviation is not large (the vehicle is not turning). In the case where the magnitude |Gy| of the lateral acceleration Gy detected by the acceleration sensor 72 is less than a turning determination threshold Gyref, the brake ECU 50 performs rear-wheel EBD control. In the case where the magnitude |Gy| of the lateral acceleration Gy is equal to or greater than the turning determination threshold Gyref, the brake ECU 50 performs front-rear-wheel EBD control. In the following description, when the rear-wheel EBD control and the front-rear-wheel EBD control are not distinguished from each other, these EBD controls are collectively referred to as the "EBD control."

The rear-wheel EBD control is identical with the EBD control in the above-described Conventional Apparatus 1. Accordingly, the brake ECU 50 computes the average of the slip ratios of the left and right front wheels and uses the average as the target slip ratios of the left and right rear wheels. For each of the left and right rear wheels, the brake ECU 50 computes a slip deviation which is the deviation of the actual slip ratio from the target slip ratio. By means of feedback control based on the slip deviations of the left and right rear wheels, the brake ECU 50 controls the braking forces of the left and right rear wheels independently of each other such that the actual slip ratios of the left and right rear wheels follow their target slip ratios. Also, for the left and right front wheels, feedback control is not performed, and an oil pressure corresponding to the amount by which the brake pedal is pressed down by the driver is supplied to the corresponding wheel cylinders. Accordingly, the braking force desired by the diver is applied to the left and right front wheels.

As a result, in the case where the position of the center of gravity of the vehicle has deviated in the lateral direction from the vehicle center, it is possible to generate an anti-spin yaw moment, which decreases the spin yaw moment produced as a result of the deviation of the position of the center of gravity, by producing a difference in braking force between the left and right rear wheels (by increasing the braking force of a rear wheel whose vertical load is large and decreasing the braking force of a rear wheel whose vertical load is small).

Meanwhile, in the front-rear-wheel EBD control, a wheel which is one of the left and right front wheels and is located on the outer side of a turning locus is selected as a reference wheel, and the actual slip ratio of the reference wheel is used as the target slip ratios of the remaining three wheels. In the following description, the wheel which is one of the left and right front wheels and is located on the outer side of the turning locus will be referred to as the "front outer wheel;" the wheel which is the other of the left and right front wheels and is located on the inner side of the turning locus will be referred to as the "front inner wheel;" the wheel which is one of the left and right rear wheels and is located on the outer side of the turning locus will be referred to as the "rear outer wheel;" and the wheel which is the other of the left and right rear wheels and is located on the inner side of the turning locus will be referred to as the "rear inner wheel."

When the brake ECU 50 performs the front-rear-wheel EBD control, the brake ECU 50 determines the turning direction of the vehicle on the basis of the lateral acceleration Gy detected by the acceleration sensor 72. The brake ECU 50 uses as the reference wheel the front outer wheel determined in accordance with the turning direction. The brake ECU 50 detects the actual slip ratios of the four wheels and uses the actual slip ratio of the reference wheel as the target slip ratios of the remaining three wheels (the front inner wheel, the rear inner wheel, and the rear outer wheel). The brake ECU 50 then computes the slip deviation (="target slip ratio"−"actual slip ratio") for the three wheels. By means of feedback control based on the slip deviations, the brake ECU 50 controls the braking forces of three wheels independently of one another such that the actual slip ratios of the three wheels follow the target slip ratios (the actual slip ratio of the reference wheel).

In the case where the braking forces of the three wheels are controlled, not only at the rear wheels but also at the front wheels, an anti-spin yaw moment can be generated on the basis of the difference in braking force between the left and right wheels.

However, in the case where the braking forces of the three wheels are controlled, not only the braking forces of the rear wheels but also the braking force of the front inner wheel is controlled. Since a larger braking force is distributed to the front wheels as compared with the rear wheels, the actual changes in the braking forces of the front wheels stemming from a change in control pressure is remarkably large as compared with the rear wheels. Therefore, as compared with the rear wheels, the front wheels are rougher in the degree of correction of vehicle behavior by braking force control. Accordingly, the distribution of braking forces must be controlled such that a behavioral error (oversteer or understeer) does not arise. Also, as compared with the rear wheels, the front wheels are large in the amount of brake oil in the hydraulic circuit. Therefore, the operation sound of the brake actuator 23 is large, and noise-related performance and vibration-related performance may deteriorate.

In order to overcome such a drawback, the brake ECU 50 corrects the feedback controlled variables of the front inner wheel and the front outer wheel during the front-rear-wheel EBD control such that, as a result of braking force control for the rear inner wheel, there is generated an anti-spin yaw moment corresponding to the feedback controlled variable computed on the basis of the deviation of the slip ratio of the front inner wheel.

Figures 2A, 2B:
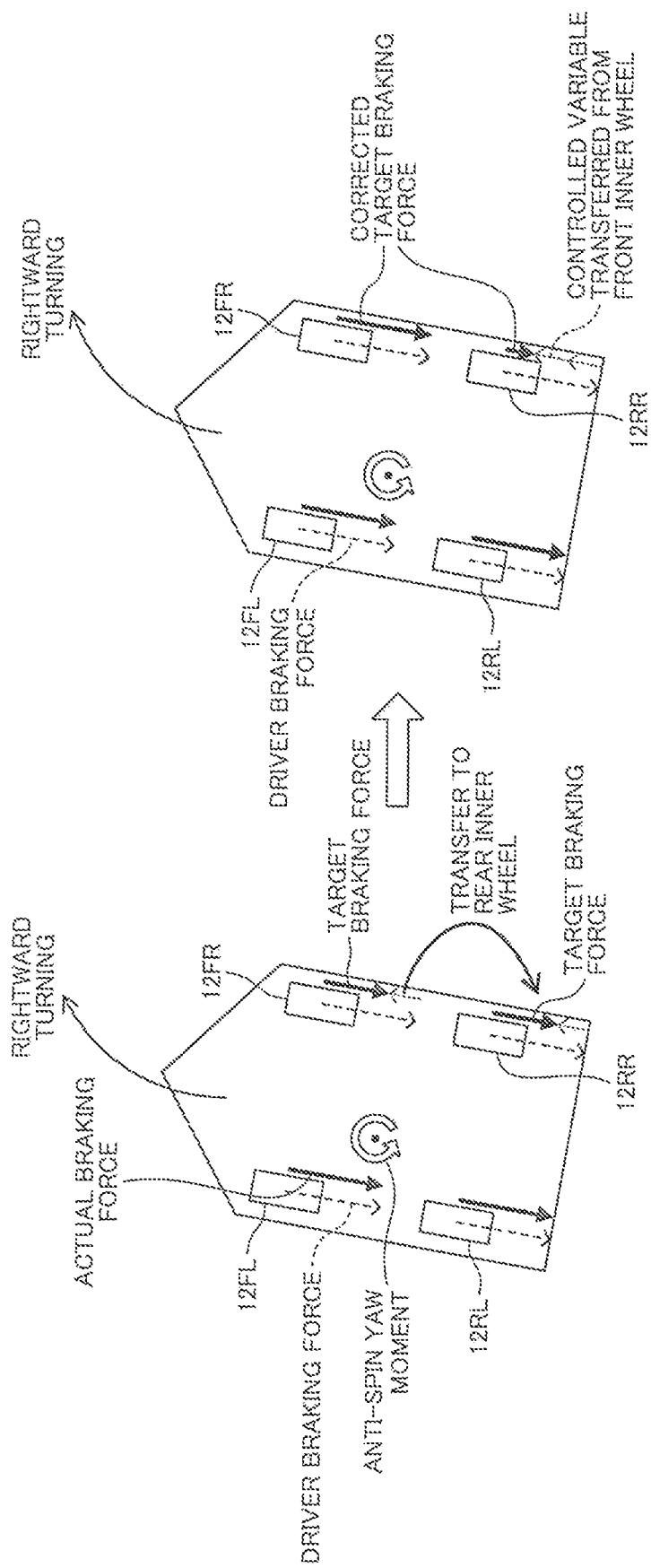
FIG. 2A is an explanatory illustration showing transfer of a controlled variable of a front inner wheel to a rear inner wheel.
FIG. 2B is an explanatory illustration showing transfer of the controlled variable of the front inner wheel to the rear inner wheel.

For example, when the vehicle turns in the rightward direction as shown in FIG. 2A, due to leftward movement of the center of gravity of the vehicle, the slip ratios of the right wheels 12FR and 12RR which are smaller in vertical load become greater than the slip ratios of the left wheels 12FL and 12RL. Therefore, in the case where, as described above, the front outer wheel 12FL is used as the reference wheel and the braking force control is performed for the remaining three wheels, the feedback controlled variables of the inner wheels 12FR and 12RR are computed such that the braking forces of the front inner wheel 12FR and the rear inner wheel 12RR are decreased. However, in the case where the braking forces are controlled by using the computed feedback controlled variables, the braking force of the front inner wheel 12FR is controlled, whereby the above-described problem may arise.

In view of the foregoing, in the front-rear-wheel EBD control of the present embodiment, as shown in FIG. 2B, the feedback controlled variables of the front inner wheel 12FR and the rear inner wheel 12RR are corrected in such a manner that the braking force which is originally to be decreased from the braking force of the front inner wheel 12FR is not decreased from the braking force of the front inner wheel 12FR; instead, the braking force which is originally to be decreased from the braking force of the front inner wheel 12FR is decreased from the braking force of the rear inner wheel 12RR. Namely, the feedback controlled variable (the feedback controlled variable of the front inner wheel 12FR) for generating an anti-spin yaw moment at the front inner wheel 12FR is transferred to the rear inner wheel 12RR.

The expression "the feedback controlled variable of the front inner wheel is transferred to the rear inner wheel" means that, at the front inner wheel, a braking force corresponding to (the entirety or a portion of) the feedback controlled variable of the front inner wheel is not generated, and a feedback controlled variable corresponding to the braking force not generated at the front inner wheel is added to the feedback controlled variable of the rear inner wheel. In the following description, the feedback controlled variable will be simply referred to as the controlled variable.

For example, the controlled variable of the front inner wheel is set to a value corresponding to the deviation of the slip ratio of the front inner wheel from the slip ratio of the front outer wheel (the reference wheel). Accordingly, in order to transfer the controlled variable for generating an anti-spin yaw moment at the front inner wheel to the rear inner wheel, the slip ratio deviations of the front inner wheel and the rear inner wheel are corrected in such a manner as to make the slip ratio deviation of the front inner wheel zero and add this slip ratio deviation to the slip ratio deviation of the rear inner wheel. In this case, since the control gain of the braking force to be generated for the slip ratio deviation differs between the front wheels and the rear wheels, the slip ratio deviations may be corrected in consideration of the control gain. As will be described later, the control gain is set to a value corresponding to the vertical load of each wheel.

As a result, the slip ratio deviations of the left and right front wheels become zero apparently, and an anti-spin yaw moment to be generated at the front inner wheel can be generated at the rear inner wheel.

In such a front-rear-wheel EBD control, the braking force of the rear inner wheel is controlled to decrease. Therefore, in the case where the braking force control for the rear inner wheel reaches its limit (corresponding to a state in which the wheel cylinder pressure is zero), the controlled variable which can be transferred from the front inner wheel to the rear inner wheel is restricted.

In the front-rear-wheel EBD control of the present embodiment, the controlled variable of the front inner wheel is preferentially transferred to the rear inner wheel. In the case where the degree of turning of the vehicle is low, the entirety of the controlled variable (controlled variable for pressure decrease which generates an anti-spin yaw moment) of the front inner wheel can be transferred to the rear inner wheel. However, when the degree of turning of the vehicle increases, the controlled variable which can be transferred from the front inner wheel to the rear inner wheel is restricted.

In the present embodiment, in a state in which the braking force of the rear inner wheel is not zero (corresponding to a state in which the wheel cylinder pressure of the rear inner wheel is not zero), the entirety of the controlled variable (for pressure decrease) of the front inner wheel is transferred to the rear inner wheel. Also, even in a state in which the braking force of the rear inner wheel is zero, the entirety of the controlled variable (for pressure decrease) of the front inner wheel is transferred to the rear inner wheel if the wheel cylinder pressure of the rear inner wheel is controlled to increase, and an anti-spin yaw moment to be generated through control of decreasing the wheel cylinder pressure of the front inner wheel is equal to or lower than a spin yaw moment generated through control of increasing the wheel cylinder pressure of the rear inner wheel.

Also, in the case where the braking force of the rear inner wheel is zero (the wheel cylinder pressure of the rear inner wheel is zero), the wheel cylinder pressure of the rear inner wheel is controlled to increase, and an anti-spin yaw moment to be generated through the control of decreasing the wheel cylinder pressure of the front inner wheel is larger than a spin yaw moment generated through the control of increasing the wheel cylinder pressure of the rear inner wheel, only a portion of the controlled variable (for pressure decrease) of the front inner wheel, which portion corresponds to the controlled variable for increasing the wheel cylinder pressure of the rear inner wheel, is transferred (distributed) to the rear inner wheel. The braking force of the front inner wheel is controlled by using the remaining portion of the controlled variable which cannot be transferred from the front inner wheel to the rear inner wheel.

In the case where the controlled variable of the front inner wheel is transferred to the rear inner wheel as described above, in the present embodiment, the slip ratio deviations are corrected by a rear-preferential slip correction process which will be described below.

The EBD control is individually performed for each wheel. When the slip ratio of a certain wheel exceeds the slip ratio of the reference wheel, the EBD control for the certain wheel is started. For example, in the case where the vehicle is in a turning state, when the slip ratio of a certain one of three wheels other than the front outer wheel (any wheel other than the front outer wheel) exceeds the slip ratio of the front outer wheel, the front-rear-wheel EBD control is started. In the case where the vehicle is not in a turning state, when the slip ratio of a certain one of the left and right rear wheels (any one of the left and right rear wheels) exceeds the average of the slip ratios of the left and right front wheels, the rear-wheel EBD control is started. Notably, dead zone values each having a certain magnitude are imparted to the slip ratio of the reference wheel (or the average of the slip ratios of the left and right front wheels) which is used for determining whether to start the EBD control. Therefore, in actuality, the EBD control is started when the slip ratio of a certain wheel exceeds the dead-zone-value added slip ratio (the slip ratio+the dead zone value) of the reference wheel or when the slip ratio of a certain wheel (any one of the left and right rear wheels) exceeds the dead-zone-value added slip ratio average (the slip ratio average+the dead zone value) of the left and right front wheels.

When the EBD control is started, instead of the master cylinder oil pressure having been supplied until then, the control oil pressure controlled by the brake actuator 23 is supplied to the wheel cylinders 24 of the wheels to be controlled.

<Rear-Preferential Slip Correction Computation Routine>

Figure 3:
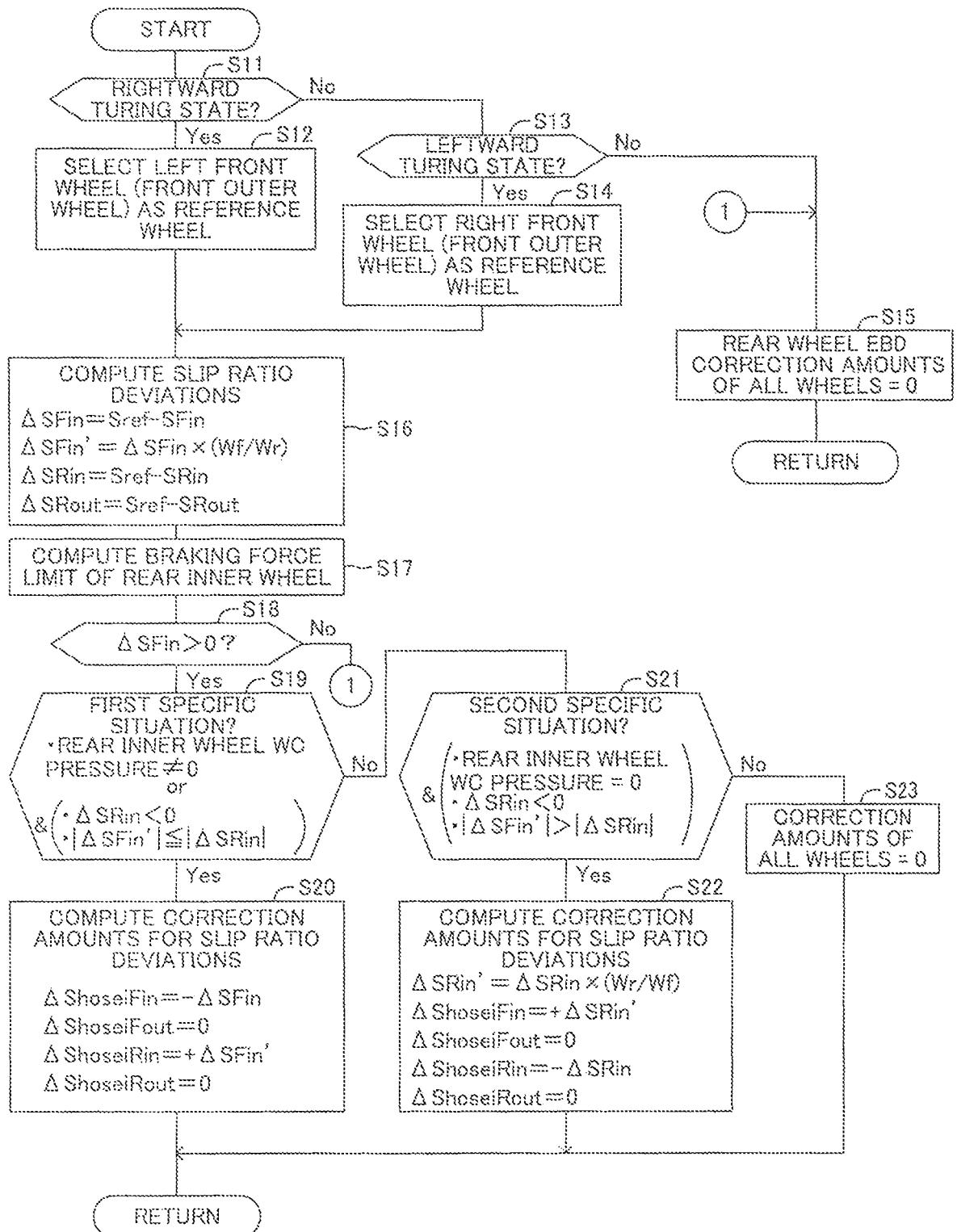
FIG. 3 is a flowchart representing a rear-preferential slip correction computation routine.

Now, a specific example of the rear-preferential slip correction process which is executed by the brake ECU 50 will be described. FIG. 3 represents the rear-preferential slip correction computation routine. The rear-preferential slip correction computation routine is repeatedly executed by the brake ECU 50 at predetermined computation intervals. The rear-preferential slip correction computation routine is a control process for correcting the slip ratio deviations used in the EBD control.

In step S11, the brake ECU 50 determines whether or not the vehicle is in a rightward turning state. In this case, the brake ECU 50 reads the detection signal output from the acceleration sensor 72 and determines whether or not the direction of the lateral acceleration Gy is a direction representing the rightward turning state and its magnitude |Gy| is equal to or greater than a turning determination threshold Gyref. In the case where the brake ECU 50 determines that the vehicle is in the rightward turning state (S11: Yes), the brake ECU 50 proceeds to step S12. In the case where the brake ECU 50 determines that the vehicle is not in the rightward turning state (S11: No), the brake ECU 50 proceeds to step S13. In step S13, the brake ECU 50 determines whether or not the vehicle is in a leftward turning state. In this case, the brake ECU 50 reads the detection signal output from the acceleration sensor 72 and determines whether or not the direction of the lateral acceleration Gy is a direction representing the leftward turning state and its magnitude |Gy| is equal to or greater than the turning determination threshold Gyref. Notably, the brake ECU 50 determines the turning direction from the sign (positive or negative) of the lateral acceleration Gy and recognizes the magnitude of the lateral acceleration Gy from the magnitude of its absolute value.

In the case where the brake ECU 50 determines in step S13 that the vehicle is not in the leftward turning state; i.e., determines that the vehicle is neither in the rightward turning state nor in the leftward turning state, the brake ECU 50 proceeds to step S15.

In the case where the brake ECU 50 determines that the vehicle is in the rightward turning state (S11: Yes), in step S12, the brake ECU 50 selects the left front wheel 12FL, which is the front outer wheel, as the reference wheel.

Meanwhile, in the case where the brake ECU 50 determines that the vehicle is in the leftward turning state (S13: Yes), in step S14, the brake ECU 50 selects the right front wheel 12FR, which is the front outer wheel, as the reference wheel.

In the case where the brake ECU 50 determines that the vehicle is neither in the rightward turning state nor in the leftward turning state (S13: No), in step S15, the brake ECU 50 sets correction amounts for the slip ratio deviations of all the wheels to zero. In the case where the vehicle is determined not to be in the rightward turning state or in the leftward turning state, the rear-wheel EBD control is performed. Accordingly, the correction amounts for the slip ratio deviations of the left and right rear wheels in the rear-wheel EBD control are set to zero. Notably, correction of the slip ratio deviations is performed in the front-rear-wheel EBD control and is not performed in the rear-wheel EBD control.

Once the left front wheel or the right front wheel is selected as the reference wheel in step S12 or step S14, in step S16, the brake ECU 50 computes a front inner wheel slip ratio deviation ΔSFin, a rear-converted front inner wheel slip ratio deviation ΔSFin', a rear inner wheel slip ratio deviation ΔSRin, and a rear outer wheel slip ratio deviation ΔSRout in accordance with the following Expressions (1), (2), (3), and (4).

The front inner wheel is the right front wheel 12FR when the vehicle is in the rightward turning state and is the left front wheel 12FL when the vehicle is in the leftward turning state. Also, the rear inner wheel is the right rear wheel 12RR when the vehicle is in the rightward turning state and is the left rear wheel 12RL when the vehicle is in the leftward turning state. The rear outer wheel is the left rear wheel 12RL when the vehicle is in the rightward turning state and is the right rear wheel 12RR when the vehicle is in the leftward turning state.

$$\Delta SFin = Sref - SFin \tag{1}$$

$$\Delta SFin' = \Delta SFin \times (Wf/Wr) \tag{2}$$

$$\Delta SRin = Sref - SRin \tag{3}$$

$$\Delta SRout = Sref - SRout \tag{4}$$

Sref represents the slip ratio of the reference wheel (the front outer wheel), SFin represents the slip ratio of the front inner wheel, and SRin represents the slip ratio of the rear inner wheel. SRout represents the slip ratio of the rear outer wheel. These slip ratios Sref, SFin, SRin, and SRout are actual slip ratios computed from the values detected by the respective wheel speed sensors 70. In the present embodiment, the slip ratio of each wheel is computed in accordance with the following Expression (5).

$$\text{slip ratio} = ((\text{wheel speed} - \text{vehicle body speed})/\text{vehicle body speed}) \times 100\% \tag{5}$$

Accordingly, the slip ratio during braking is a negative value. In the present specification, when the magnitude of the slip ratio (slippage degree) is discussed, the magnitude of the absolute value of the slip ratio is used. Accordingly, the expression "the slip ratio is large" means that "the absolute value of the slip ratio is large." Only in the case where a relational expression using a slip ratio is provided, the sign of the slip ratio is taken into consideration.

(Wf/Wr) is the ratio of the vertical load Wf of the front inner wheel to the vertical load Wr of the rear inner wheel. For example, the vertical load Wf of the front inner wheel can be obtained by adding a longitudinal load movement amount ΔWx (an amount of load moved in the longitudinal direction due to braking) to a load Wf0 at the time of straight constant speed travel and subtracting from the resultant value a lateral load movement amount ΔWy (an amount of load moved in the lateral direction) (Wf=Wf0+ΔWx−ΔWy). Also, the rear inner wheel vertical load Wr can be obtained by subtracting the longitudinal load movement amount ΔWx and the lateral load movement amount ΔWy from a load Wr0 at the time of straight constant speed travel (Wr=Wr0−ΔWx−ΔWy).

The reason why the front inner wheel slip ratio deviation ΔSFin is multiplied by the load ratio (Wf/Wr) is that the front-wheel-side slip ratio deviation is converted to a rear-wheel-side slip ratio deviation which becomes necessary to generate, on the rear wheel side, a braking force corresponding to the front-wheel-side slip ratio deviation. Accordingly, the load ratio (Wf/Wr) is a braking force conversion coefficient.

The longitudinal load movement amount ΔWx is computed in accordance with the following Expression (6).

$$\Delta Wx = M \cdot |Gx| \cdot H/L \tag{6}$$

In Expression (6), M represents the weight of the vehicle, H represents the height of the center of gravity of the vehicle, and L represents the wheel base of the vehicle. These values are known. Gx represents the acceleration in the longitudinal direction of the vehicle, and the value detected by the acceleration sensor 72 is used.

The lateral load movement amount ΔWy is computed in accordance with the following Expression (7).

$$\Delta Wy = M \cdot |Gy| \cdot H \cdot \phi f/D \tag{7}$$

In Expression (7), D represents the tread of the vehicle, and φf represents a roll stiffness distribution ratio.

Subsequently, in step S17, the brake ECU 50 computes a braking force limit of the rear inner wheel. In step S17, the brake ECU 50 checks whether or not the limit to which the braking force of the rear inner wheel can be decreased is reached; i.e., whether or not the wheel cylinder pressure of the rear inner wheel is zero.

Subsequently, in step S18, the brake ECU 50 determines whether or not the front inner wheel slip ratio deviation ΔSFin is a positive value (ΔSFin>0). In the case where the front inner wheel slip ratio deviation ΔSFin is a positive value, the front inner wheel is larger in slippage degree than the front outer wheel. In the case where the front inner wheel slip ratio deviation ΔSFin is a positive value (S18: Yes), the brake ECU 50 proceeds to step S19.

Meanwhile, in the case where the front inner wheel slip ratio deviation ΔSFin is not a positive value (S18: No), the vehicle is in a state in which presumably no spin yaw moment is generated. Therefore, the brake ECU 50 proceeds to step S15 so as to set the correction amounts for the slip ratio deviations of all the wheels to zero. In this case, the rear-wheel EBD control is performed. After performing the process of step S15, the brake ECU 50 ends the current execution of the rear-preferential slip correction computation routine. The brake ECU 50 repeatedly executes the rear-preferential slip correction computation routine at predetermined computation intervals.

In step S19, the brake ECU 50 determines whether or not the current situation is a first specific situation in which the entirety of the controlled variable of the front inner wheel can be transferred to the rear inner wheel. The brake ECU 50 determines that the current situation is the first specific situation when the following Conditions 1, 2, and 3 are satisfied as follows.

Condition 1: the rear inner wheel is not in a braking force limit state (corresponding to a state in which the wheel cylinder pressure is zero).

Condition 2: the rear inner wheel slip ratio deviation ΔSRin is a negative value (ΔSRin<0).

Condition 3: the absolute value |ΔSFin'| of the rear-converted front inner wheel slip ratio deviation is equal to or smaller than the absolute value |ΔSRin| of the rear inner wheel slip ratio deviation (|ΔSFin'|≤|ΔSRin|).

Conditions for determining that the current situation is the first specific situation: ((Condition 1) or ((Condition 2) and (Condition 3)))

Condition 2 is satisfied in a state in which the degree of slippage of the rear inner wheel is smaller than the degree of slippage of the reference wheel; namely, in a state in which the braking pressure of the rear inner wheel is about to be increased (the spin yaw moment is about to be increased by the rear inner wheel). In this case, the braking pressure of the rear inner wheel must be decreased so as to stop an increase in the braking pressure of the rear inner wheel.

Condition 3 is satisfied in a state in which the controlled variable which decreases the braking pressure of the front inner wheel (the controlled variable which acts to increase the anti-spin yaw moment) is equal to or smaller than the controlled variable for increasing the braking pressure of the rear inner wheel (the controlled variable which acts to increase the spin yaw moment).

In the case where Condition 1 is satisfied or Conditions 2 and 3 are both satisfied (((Condition 1) or ((Condition 2) and (Condition 3))), the brake ECU 50 determines that the situation at the present point in time is the first specific situation.

In the case where the brake ECU 50 determines that the situation at the present point in time is the first specific situation (S19: Yes), in step S20, the brake ECU 50 sets a correction amount ΔShoseiFin for the slip ratio deviation of the front inner wheel, a correction amount ΔShoseiFout for the slip ratio deviation of the front outer wheel, a correction amount ΔShoseiRin for the slip ratio deviation of the rear inner wheel, and a correction amount ΔShoseiRout for the slip ratio deviation of the rear outer wheel in accordance with the following Expressions (8) to (11).

$$\Delta ShoseiFin = -\Delta SFin \tag{8}$$

$$\Delta ShoseiFout = 0 \tag{9}$$

$$\Delta ShoseiRin = +\Delta SFin' \tag{10}$$

$$\Delta ShoseiRout = 0 \tag{11}$$

Accordingly, the corrected slip ratio deviation of the front inner wheel has a value obtained by adding the correction amount (−ΔSFin) to the slip ratio deviation ΔSFin before the correction. Consequently, the corrected slip ratio deviation ΔSFin of the front inner wheel is zero.

Also, the corrected slip ratio deviation of the rear inner wheel has a value obtained by adding the correction amount (+ΔSFin') to the slip ratio deviation ΔSRin before the correction (ΔSRin=ΔSRin+ΔSFin').

Both the correction amount ΔShoseiFout for the slip ratio deviation of the front outer wheel and the correction amount ΔShoseiRout for the slip ratio deviation of the rear outer wheel are set to zero.

As a result of this process, the corrected slip ratio deviation of the front inner wheel becomes zero, and the slip ratio deviation of the rear inner wheel is corrected to increase such that a controlled variable corresponding to a braking force which originally causes generation of an anti-spin yaw moment at the front inner wheel (if correction of the slip ratio deviation is not performed) can be added to the controlled variable of the rear inner wheel. Consequently, the entirety of the controlled variable (the controlled variable of the front inner wheel) for generating the anti-spin yaw moment at the front inner wheel can be transferred to the rear inner wheel.

In the case where the brake ECU 50 determines that the current situation is not the first specific situation (S19: No), in step S21, the brake ECU 50 determines whether or not the current situation is a second specific situation in which a portion of the controlled variable of the front inner wheel can be transferred to the rear inner wheel. The brake ECU 50 determines that the current situation is the second specific situation when the following Conditions 21, 22, and 23 are satisfied as follows.

Condition 21: the rear inner wheel is in a braking force limit state (corresponding to a state in which its wheel cylinder pressure is zero).

Condition 22: the rear inner wheel slip ratio deviation ΔSRin is a negative value (ΔSRin<0).

Condition 23: the absolute value |ΔSFin'| of the rear-converted front inner wheel slip ratio deviation is larger than the absolute value |ΔSRin| of the rear inner wheel slip ratio deviation (|ΔSFin'|>|ΔSRin|).

Conditions for determining that the current situation is the second specific situation: ((Condition 21) and (Condition 22) and (Condition 23))

Condition 23 is satisfied in a state in which the controlled variable for decreasing the braking pressure of the front inner wheel (the controlled variable which acts to increase the anti-spin yaw moment) is larger than the controlled variable for increasing the braking pressure of the rear inner wheel (the controlled variable which acts to increase the spin yaw moment). In such a case, the controlled variable of the front inner wheel can be transferred to the rear inner wheel by an amount corresponding to the controlled variable which increases the braking pressure of the rear inner wheel.

The brake ECU 50 determines that the current situation is the second specific situation when Conditions 21, 22, and 23 are all satisfied ((Condition 21) and (Condition 22) and (Condition 23)).

In the case where the brake ECU 50 determines that the situation at the present point in time is the second specific situation (S21: Yes), in step S22, the brake ECU 50 sets a front-converted rear inner wheel slip ratio deviation ΔSRin', the correction amount ΔShoseiFin for the slip ratio deviation of the front inner wheel, the correction amount ΔShoseiFout for the slip ratio deviation of the front outer wheel, the correction amount ΔShoseiRin for the slip ratio deviation of the rear inner wheel, and the correction amount ΔShoseiRout for the slip ratio deviation of the rear outer wheel in accordance with the following Expressions (12) to (16).

$$\Delta SRin' = \Delta SRin \times (Wr/Wf) \quad (12)$$

$$\Delta ShoseiFin = +\Delta SRin' \quad (13)$$

$$\Delta ShoseiFout = 0 \quad (14)$$

$$\Delta ShoseiRin = -\Delta SRin \quad (15)$$

$$\Delta ShoseiRout = 0 \quad (16)$$

(Wr/Wf) in Expression (12) is the ratio of the vertical load Wr of the rear inner wheel to the vertical load Wf of the front inner wheel. Namely, the load ratio (Wr/Wf) is the reciprocal of the load ratio (Wf/Wr) used in Expression (2).

Consequently, the corrected slip ratio deviation of the front inner wheel has a value obtained by adding the correction amount (+ΔSRin') to the slip ratio deviation ΔSFin before the correction (ΔSFin=ΔSFin+ΔSRin').

Also, the corrected slip ratio deviation of the rear inner wheel has a value obtained by adding the correction amount (−ΔSRin) to the slip ratio deviation ΔSRin before the correction (ΔSRin=ΔSRin−ΔSRin). Accordingly, the corrected slip ratio deviation of the rear inner wheel is zero.

Also, the correction amount ΔShoseiFout for the slip ratio deviation of the front outer wheel and the correction amount ΔShoseiRout for the slip ratio deviation of the rear outer wheel are set to zero.

As a result of the above-described process, the slip ratio deviation of the rear inner wheel is corrected to become zero, and an amount (slip ratio correction amount converted to braking force) corresponding to the correction amount is added to the slip ratio deviation of the front inner wheel for correction. Accordingly, the controlled variable of the front inner wheel is prevented from being transferred to the rear inner wheel excessively. Also, at the front inner wheel, an anti-slip yaw moment can be generated by using a controlled variable corresponding to the remaining portion of the controlled variable which cannot be transferred to the rear inner wheel.

Meanwhile, in the case where the brake ECU 50 determines that the current situation is not the second specific situation (S21: No), the brake ECU 50 proceeds to step S23 so as to set the correction amounts for the slip ratio deviations of all the wheels to zero. Accordingly, at the front inner wheel, an anti-slip yaw moment can be generated by using a controlled variable corresponding to the slip deviation of the front inner wheel.

After computing the correction amounts for the slip ratio deviations in step S20, step S22, step S23, or step S15, the brake ECU 50 ends the current execution of the rear-preferential slip correction computation routine. The brake ECU 50 repeatedly executes the rear-preferential slip correction computation routine at predetermined computation intervals.

<Braking Force Computation>

Next, a method of computing braking forces generated in the EBD control will be described with reference to a computation block diagram shown in FIG. 4. The brake ECU 50 corrects the slip ratio deviations on the basis of the slip ratio deviation correction amounts computed in the rear-preferential slip correction computation routine and computes target braking forces through feedback control based on the corrected slip ratio deviations (ΔSFin, ΔSFout, ΔSRin, ΔSRout). Hereinafter, the corrected slip ratio deviations ΔSFin, ΔSFout, ΔSRin, and ΔSRout will be collectively referred to as the slip ratio deviation ΔS. Notably, during the front-rear-wheel EBD control, since the front outer wheel serves as the reference wheel, the value of the slip ratio deviation ΔSFout of the front outer wheel is zero. Also, during the rear-wheel EBD control, since the braking forces of the left and right front wheels are not controlled, the values of the slip ratio deviations ΔSFin and ΔSFout are zero.

Figure 4:
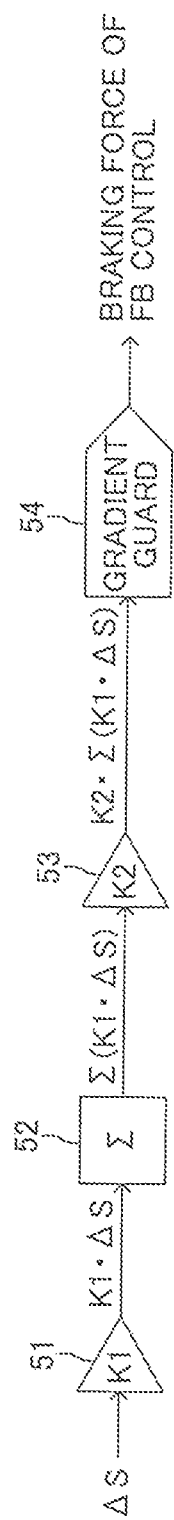
FIG. 4 is a block diagram representing computation processing of feedback control.

FIG. 4 shows blocks for braking force computation. For example, braking force computation is repeatedly executed in the order of the right front wheel 12FR→the left front wheel 12FL→the right rear wheel 12RR→the left rear wheel 12RL. In the following description, a wheel for which the braking force computation is performed will be referred to as the wheel of interest. As shown in FIG. 4, the slip ratio deviation ΔS is input to an FB controlled variable computation section 51 at predetermined computation intervals. Every time the slip ratio deviation ΔS is input to the FB controlled variable computation section 51, the FB controlled variable computation section 51 multiplies the slip ratio deviation ΔS by an FB gain K1. This FB gain K1 is a proportional coefficient representing the characteristics of a proportional relation between wheel slip ratio and braking force and is a value called braking stiffness. Every time the computation ends, the computation result (K1·ΔS) is output from the FB controlled variable computation section 51 to an integrator 52. The output (K1·ΔS) of the FB controlled variable computation section 51 represents a feedback controlled variable. In the case where the slippage degree of the wheel of interest is higher than a target slippage degree, the feedback controlled variable (K1·ΔS) is computed to have a value for decreasing the slippage degree of the wheel of interest (decreasing the wheel cylinder pressure of the wheel of interest). In the case where the slippage degree of the wheel of interest is lower than the target slippage degree, the feedback controlled variable (K1·ΔS) is computed to have a value for increasing the slippage degree of the wheel of interest (increasing the wheel cylinder pressure of the wheel of interest). For example, when the sign of the output (K1·ΔS) of the FB controlled variable computation section 51 is positive, the output represents a feedback controlled variable which acts to increase the wheel cylinder pressure, and when the sign of the output (K1·ΔS) of the FB controlled variable computation section 51 is negative, the output represents a feedback controlled variable which acts to decrease the wheel cylinder pressure. Accordingly, correcting the slip ratio deviation ΔS as described above means correcting the feedback controlled variable.

Every time the output (K1·ΔS) of the FB controlled variable computation section 51 is input to the integrator 52, the integrator 52 adds the input value to the values input to the integrator 52 until then and outputs an integral value ($\Sigma(K1 \cdot \Delta S)$), which is the result of the addition, to a load gain multiplier 53.

Every time the output ($\Sigma(K1 \cdot \Delta S)$) of the integrator 52 is input to the load gain multiplier 53, the load gain multiplier 53 multiplies the input value by a load gain K2 and outputs the multiplication result ($K2 \cdot \Sigma(K1 \cdot \Delta S)$) to a gradient guard 54. The load gain K2 is a value corresponding to the vertical load of the wheel of interest. The reason why the load ratio is used for the above-described slip ratio deviation correction computation is that, in the course of computation of the braking force, the load gain K2 corresponding to the vertical load is used for the multiplication in this load gain multiplier 53. Namely, in the case where the controlled variable of the front inner wheel is transferred to the rear inner wheel, the correction amount for the slip ratio deviation must be converted by using the braking force ratio.

When the change gradient of the value input to the gradient guard 54 exceeds an upper limit gradient set in advance, the gradient guard 54 converts the input value to a value whose change gradient is limited to the upper limit gradient. The value output from this gradient guard 54 is the braking force by the EBD control. Since this braking force is a braking force generated as a result of the feedback control based on the slip ratio deviation, a final target braking force to be applied to the wheel is obtained by adding together the braking force at the time when the EBD control is started and the output value of this gradient guard 54 (the braking force generated by the feedback control).

For each wheel, the brake ECU 50 controls the operation of the brake actuator 23 to generate the target braking force calculated as described above.

<EBD End Control>

In the case where the above-described EBD rear-preferential slip correction computation routine is executed, the controlled variable of the front inner wheel is transferred to the controlled variable of the rear inner wheel. If the EBD control for the front inner wheel continues despite that the EBD control for the rear inner wheel has ended, the controlled variable to be transferred from the front inner wheel to the rear inner wheel cannot be received by the rear inner wheel. For example, in the case where the detection value of the wheel speed sensor 70 of the front inner wheel has deviated from the normal value, even when the EBD control for the rear inner wheel ends, the EBD control for the front inner wheel may be continued.

Figure 5:
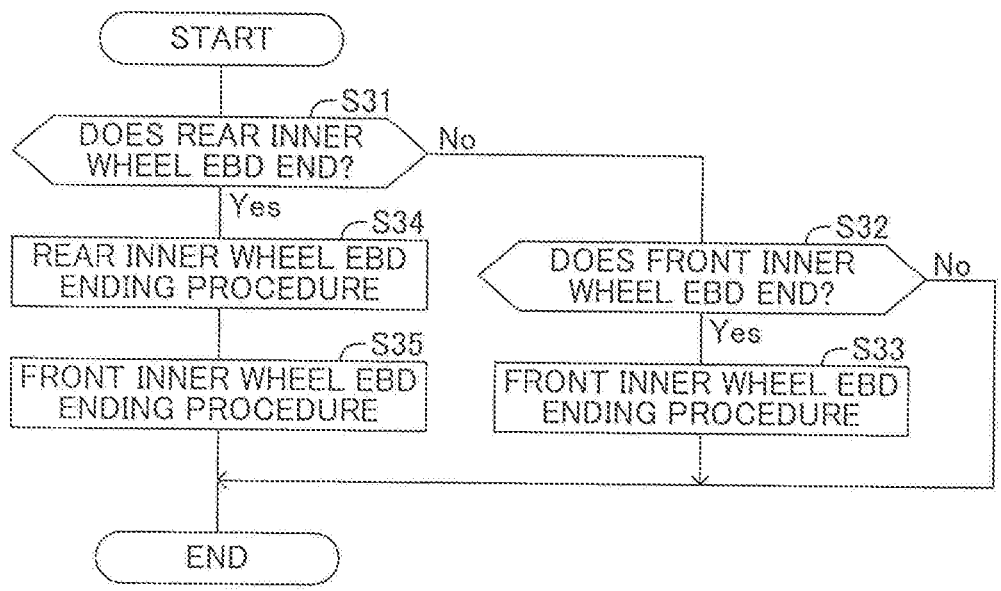
FIG. 5 is a flowchart representing an EBD end control routine.

In view of the foregoing, the brake ECU 50 performs EBD end control as shown below. FIG. 5 shows an EBD end control routine executed by the brake ECU 50. The EBD end control routine is repeatedly executed at predetermined computation intervals.

In step S31, the brake ECU 50 determines whether or not an end condition for ending the EBD control for the rear inner wheel is satisfied. The end condition can be set arbitrarily. For example, the end condition for ending the EBD control for each wheel is satisfied when the slippage degree of a wheel of interest is determined to have become equal to or lower than the slippage degree of the reference wheel without performance of the braking force control. In the case where the end condition for ending the EBD control for the rear inner wheel is not satisfied (S31: No), in step S32, the brake ECU 50 determines whether or not an end condition for ending the EBD control for the front inner wheel is satisfied.

The brake ECU 50 repeats such determination (S31, S32). In the case where the end condition for ending the EBD control for the front inner wheel is satisfied, in step S33, the brake ECU 50 ends the EBD control for the front inner wheel. Meanwhile, in the case where the end condition for ending the EBD control for the rear inner wheel is satisfied before the end condition for ending the EBD control for the front inner wheel is satisfied, in step S34, the brake ECU 50 ends the EBD control for the rear inner wheel, and in step S35, the brake ECU 50 ends the EBD control for the front inner wheel.

As a result, the EBD control for the front inner wheel can be ended properly.

According to the above-described vehicular braking control apparatus of the present embodiment, in the case where the vehicle is determined to be in a predetermined turning state, the front-rear-wheel EBD control is performed. In this front-rear-wheel EBD control, the front outer wheel is selected as a reference wheel, and the braking forces of the remaining three wheels are controlled such that the slip ratios of the remaining three wheels coincide with the slip ratio of the reference wheel. In this case, in order that the controlled variable of the front inner wheel is transferred to the rear inner wheel, the slip ratio deviation of the front inner wheel is corrected to become zero, and the slip ratio deviation of the rear inner wheel is corrected through addition of a value corresponding to the correction amount (a value obtained by converting the correction amount by using the braking force ratio).

As a result, an anti-spin yaw moment can be generated by the braking force control for the rear inner wheel without use of the braking force control for the front inner wheel. Also, in the case where the limit of the braking force at the rear inner wheel is reached, in order to make up for the insufficiency of the anti-spin yaw moment, an anti-spin yaw moment can be generated by decreasing the wheel cylinder pressure of the front inner wheel.

Accordingly, since the braking force is controlled by preferentially using the rear inner wheel which is finer in the degree of correction of vehicle behavior than the front inner wheel, a behavioral error (oversteer or understeer) can be suppressed well. Also, deterioration of noise-related performance and vibration-related performance of the brake actuator 23 can be prevented to the greatest possible extent. Also, since the front outer wheel whose slippage degree is the smallest is selected as the reference wheel, the the front-rear-wheel EBD control can be performed properly.

While the vehicular braking control apparatus of the embodiment has been described, the present disclosure is not limited to the above-described embodiment and may be embodied in various forms without departing from the scope of the disclosure.

For example, in the present embodiment, the controlled variable of the front inner wheel is transferred only to the rear inner wheel. However, the embodiment may be modified to transfer the controlled variable of the front inner wheel to the rear inner wheel and the rear outer wheel such that one half of the controlled variable of the front inner wheel is distributed to the rear inner wheel and the other half of the controlled variable is distributed to the rear outer wheel. In this case, the controlled variable must be distributed to the rear outer wheel such that the braking force of the rear outer wheel increases. For example, one half (½) of the rear-converted front inner wheel slip ratio deviation $\Delta SFin'$ may be added to the slip ratio deviation $\Delta SRin$ of the rear inner wheel, and the other half (½) of the rear-converted front inner wheel slip ratio deviation $\Delta SFin'$ may be subtracted from the slip ratio deviation $\Delta SRout$ of the rear outer wheel. Also, for example, the controlled variable of the front inner wheel may be transferred only to the rear outer wheel.

In this case, correction is performed to decrease the slip ratio deviation ΔSRout of the rear outer wheel by the rear-converted front inner wheel slip ratio deviation ΔSFin'.

In the present embodiment, for braking force correction, each slip ratio deviation is corrected directly. However, the embodiment may be modified, for example, in such a manner that the target slip ratio or the actual slip ratio is corrected, by using the slip ratio deviation correction amount, whereby the slip ratio deviation is corrected, and the braking force is finally corrected.

What is claimed is:

1. A braking control apparatus for a vehicle comprising:
a brake apparatus which can control braking forces of left and right front wheels and left and right rear wheels independently of one another;
slippage degree detection means for detecting slippage degrees of the left and right front wheels and the left and right rear wheels;
front wheel slippage deviation computation means for computing a front wheel slippage deviation which is a slippage degree deviation between the left and right front wheels;
front wheel braking force control means for controlling the braking force of one wheel of the left and right front wheels through first feedback control based on the front wheel slippage deviation such that the slippage degree of the one wheel approaches the slippage degree of the other wheel;
rear wheel braking force control means for controlling the braking forces of the left and right rear wheels independently of each other through second feedback control based on rear wheel slippage deviations which are deviations of the slippage degrees of the left and right rear wheels from a target slippage degree common between the left and right rear wheels such that the slippage degrees of the left and right rear wheels approach the target slippage degree;
turning determination means for determining whether or not the vehicle is in a turning state; and
correction means, operable when the turning determination means determines that the vehicle is in the turning state, to:
correct a first feedback controlled variable of the one wheel of the left and right front wheels based on the front wheel slippage deviation by correcting the front wheel slippage deviation such that the front wheel slippage deviation becomes zero; and
correct a second feedback controlled variable based on a rear wheel slippage deviation in the rear wheel braking force control means by an amount corresponding to the correction amount of the first feedback controlled variable, thereby generating an anti-spin yaw moment in a direction opposite a direction of a spin yaw moment of the vehicle generated as a result of load movement in a lateral direction.

2. The braking control apparatus for the vehicle according to claim 1, wherein,
the correction means is configured to correct the second feedback controlled variable in the rear wheel braking force control means by correcting the rear wheel slippage deviation such that the rear wheel slippage deviation increases with increasing the front wheel slippage deviation.

3. The braking control apparatus for the vehicle according to claim 1, wherein,
the correction means is configured to determine the correction amount of the first feedback controlled variable of one wheel of the left and right front wheels such that an anti-spin yaw moment is generated by the first feedback control of the one wheel of the left and right front wheels only when the braking force control performed by the rear wheel braking force control means has reached a limit.

4. The braking control apparatus for the vehicle according to claim 1, wherein,
the front wheel braking force control means is configured:
to select, as a reference wheel, a front outer wheel, which is one of the left and right front wheels located on an outer side of a turning locus; and
to control the braking force of a front inner wheel, which is the other of the left and right front wheels located on the inner side of the turning locus, by the first feedback control based on the front wheel slippage deviation, such that the slippage degree of the front inner wheel approaches the slippage degree of the reference wheel; and
the correction means is configured:
to correct the first feedback controlled variable of the front inner wheel based on the front wheel slippage deviation such that the first feedback controlled variable becomes zero; and
to correct the second feedback controlled variable of a rear inner wheel, which is one of the left and right rear wheels located on the inner side of the turning locus, by an amount corresponding to the correction amount of the first feedback controlled variable of the front inner wheel.

5. The braking control apparatus for the vehicle according to claim 4, further comprising target slippage degree setting means for setting target slippage degrees of three wheels other than the front outer wheel to the slippage degree of the front outer wheel,
wherein,
the front wheel braking force control means is configured to control the braking force of the front inner wheel by the first feedback control based on the front wheel slippage deviation such that the slippage degree of the front inner wheel approaches the target slippage degree;
the rear wheel braking force control means is configured to control the braking forces of the rear inner wheel and a rear outer wheel by the second feedback control based on each rear wheel slippage deviation such that the slippage degrees of the rear inner wheel and the rear outer wheel approach the target slippage degrees; and
the correction means is configured:
to correct the first feedback controlled variable of the front inner wheel based on the front wheel slippage deviation by correcting the front wheel slippage deviation such that the front wheel slippage deviation becomes zero;
to compute a rear-converted front deviation, which is a value of the rear wheel slippage deviation obtained by multiplying the front wheel slippage deviation by a predetermined conversion coefficient; and
to correct the second feedback controlled variable of the rear inner wheel by adding the rear-converted front deviation to the deviation of the slippage degree of the rear inner wheel from the target slippage degree.

6. The braking control apparatus for the vehicle according to claim 4, wherein,
the correction means is configured to determine the correction amount of the first feedback controlled variable of the front inner wheel such that the braking force of the front inner wheel decreases in a case where the rear inner wheel has reached a control limit state in which the braking force of the rear inner wheel cannot be decreased.

7. The braking control apparatus for the vehicle according to claim 4, further comprising:
end determination means for determining whether or not the control of the braking force of the rear inner wheel by the rear wheel braking force control means has ended; and
continuation prohibition control means for prohibiting the front wheel braking force control means from continuing the control of the braking force of the front inner wheel when the end determination means determines that the control of the braking force of the rear inner wheel has ended.

8. A braking control apparatus for a vehicle comprising:
a brake apparatus which can control braking forces of left and right front wheels and left and right rear wheels independently of one another; and
a brake ECU configured to:
detect slippage degrees of the left and right front wheels and the left and right rear wheels;
compute a front wheel slippage deviation which is a slippage degree deviation between the left and right front wheels;
control the braking force of one wheel of the left and right front wheels through first feedback control based on the front wheel slippage deviation such that the slippage degree of the one wheel approaches the slippage degree of the other wheel;
control the braking forces of the left and right rear wheels independently of each other through second feedback control based on rear wheel slippage deviations which are deviations of the slippage degrees of the left and right rear wheels from a target slippage degree common between the left and right rear wheels such that the slippage degrees of the left and right rear wheels approach the target slippage degree;
determine whether or not the vehicle is in a turning state; and
when the brake ECU determines that the vehicle is in the turning state;
correct a first feedback controlled variable of the one wheel of the left and right front wheels based on the front wheel slippage deviation by correcting the front wheel slippage deviation such that the front wheel slippage deviation becomes zero;
correct a second feedback controlled variable based on a rear wheel slippage deviation by an amount corresponding to the correction amount of the first feedback controlled variable, thereby generating an anti-spin yaw moment in a direction opposite a direction of a spin yaw moment of the vehicle generated as a result of load movement in a lateral direction.

9. The braking control apparatus for the vehicle according to claim 8, wherein the brake ECU is configured to:
correct the second feedback controlled variable by correcting the rear wheel slippage deviation such that the rear wheel slippage deviation increases with increasing the front wheel slippage deviation.

10. The braking control apparatus for the vehicle according to claim 8, wherein the brake ECU is configured to:
determine the correction amount of the first feedback controlled variable of one wheel of the left and right front wheels such that an anti-spin yaw moment is generated by the first feedback control of the one wheel of the left and right front wheels only when the braking force control has reached a limit.

11. The braking control apparatus for the vehicle according to claim 8, wherein the brake ECU is configured to:
select, as a reference wheel, a front outer wheel, which is one of the left and right front wheels located on an outer side of a turning locus;
control the braking force of a front inner wheel, which is the other of the left and right front wheels located on the inner side of the turning locus, by the first feedback control based on the front wheel slippage deviation, such that the slippage degree of the front inner wheel approaches the slippage degree of the reference wheel;
correct the first feedback controlled variable of the front inner wheel based on the front wheel slippage deviation such that the first feedback controlled variable becomes zero; and
correct the second feedback controlled variable of a rear inner wheel, which is one of the left and right rear wheels located on the inner side of the turning locus, by an amount corresponding to the correction amount of the first feedback controlled variable of the front inner wheel.

12. The braking control apparatus for the vehicle according to claim 11, wherein the brake ECU is configured to:
set target slippage degrees of three wheels other than the front outer wheel to the slippage degree of the front outer wheel;
control the braking force of the front inner wheel by the first feedback control based on the front wheel slippage deviation such that the slippage degree of the front inner wheel approaches the target slippage degree;
control the braking forces of the rear inner wheel and a rear outer wheel by the second feedback control based on each rear wheel slippage deviation such that the slippage degrees of the rear inner wheel and the rear outer wheel approach the target slippage degrees;
correct the first feedback controlled variable of the front inner wheel based on the front wheel slippage deviation by correcting the front wheel slippage deviation such that the front wheel slippage deviation becomes zero;
compute a rear-converted front deviation, which is a value of the rear wheel slippage deviation obtained by multiplying the front wheel slippage deviation by a predetermined conversion coefficient; and
correct the second feedback controlled variable of the rear inner wheel by adding the rear-converted front deviation to the deviation of the slippage degree of the rear inner wheel from the target slippage degree.

13. The braking control apparatus for the vehicle according to claim 11, wherein the brake ECU is configured to:
determine the correction amount of the first feedback controlled variable of the front inner wheel such that the braking force of the front inner wheel decreases in a case where the rear inner wheel has reached a control limit state in which the braking force of the rear inner wheel cannot be decreased.

14. The braking control apparatus for the vehicle according to claim 11, wherein the brake ECU is configured to:
determine whether or not the control of the braking force of the rear inner wheel has ended; and prohibit the brake ECU continuing the control of the braking force of the front inner wheel when the brake ECU determines that the control of the braking force of the rear inner wheel has ended.

* * * * *